United States Patent
Burgess (10) Patent No.: US 10,146,021 B2
(45) Date of Patent: *Dec. 4, 2018

(54) MODULAR MONITORED PATCH PANEL SYSTEM

(71) Applicant: Facebook, Inc., Menlo Park, CA (US)

(72) Inventor: Kirk Erik Burgess, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/058,948

(22) Filed: Mar. 2, 2016

(65) Prior Publication Data
US 2017/0139165 A1 May 18, 2017

(51) Int. Cl.
*H04B 10/07* (2013.01)
*G02B 6/42* (2006.01)
(Continued)

(52) U.S. Cl.
CPC ......... *G02B 6/4286* (2013.01); *G02B 6/2804* (2013.01); *G02B 6/3895* (2013.01); *G02B 6/3897* (2013.01); *G02B 6/4452* (2013.01); *H04B 10/07955* (2013.01); *H04B 10/2503* (2013.01); *H04B 10/2504* (2013.01); *H04B 10/801* (2013.01)

(58) Field of Classification Search
None
See application file for complete search history.

(56) References Cited

U.S. PATENT DOCUMENTS

| 5,394,503 A | * | 2/1995 | Dietz, Jr. | G02B 6/3817 |
| | | | | 385/134 |
| 6,915,036 B2 | * | 7/2005 | Bhalla | H04J 3/04 |
| | | | | 385/15 |

(Continued)

FOREIGN PATENT DOCUMENTS

JP    2007-057642    *  3/2007  ............... G02B 6/26

OTHER PUBLICATIONS

P. Trindell: "Connectors and Splices: Correct Alignment Spells Success", The 2005 Photonics Handbook: Fiber: Fiber Optics and Communications, pp. H134-H138, 2005. Online, https://www.photonics.com/Splash.aspx?Tag=fiber+optic+connectors&Type=HBA, Mar. 8, 2009.*

(Continued)

*Primary Examiner* — Li Liu
(74) *Attorney, Agent, or Firm* — Van Pelt, Yi & James LLP (57) ABSTRACT

A modular fiber optic patch panel system is disclosed. The system includes an enclosure and at least one patch panel module mounted in the enclosure. The enclosure includes a chassis with multiple module bays, each configured to receive a corresponding patch panel module. The patch panel modules each include a module housing, an input connector and an output connector. An optical directional coupler is connected to the input connector and a photodiode is positioned adjacent the optical directional coupler to measure an optical power level conveyed on the optical fiber. A data acquisition device is connected to the photodiode to capture the optical power level data and a microcontroller is connected to the data acquisition device to store the data.

20 Claims, 7 Drawing Sheets

(51) Int. Cl.
  *G02B 6/38*  (2006.01)
  *G02B 6/44*  (2006.01)
  *H04B 10/079*  (2013.01)
  *H04B 10/25*  (2013.01)
  *H04B 10/80*  (2013.01)
  *G02B 6/28*  (2006.01)

(56) References Cited

U.S. PATENT DOCUMENTS

| | | | |
|---|---|---|---|
| 6,917,763 B1 | 7/2005 | Au et al. | |
| 7,272,309 B1 | 9/2007 | Tamil et al. | |
| 7,517,243 B2* | 4/2009 | Caveney | H01R 13/641 |
| | | | 439/489 |
| 7,526,200 B2 | 4/2009 | Nakano et al. | |
| 7,542,675 B1* | 6/2009 | Graves | H04Q 11/0005 |
| | | | 398/45 |
| 9,097,874 B2* | 8/2015 | Coleman | G02B 6/4472 |
| 9,219,543 B2* | 12/2015 | Smith | H04B 10/07955 |
| 2004/0085621 A1 | 5/2004 | Sekiya et al. | |
| 2005/0191056 A1* | 9/2005 | Coffey | H04J 14/02 |
| | | | 398/79 |
| 2007/0036506 A1* | 2/2007 | Kewitsch | G02B 6/4457 |
| | | | 385/135 |
| 2007/0043809 A1* | 2/2007 | Aultman, Sr. | H04L 49/40 |
| | | | 709/203 |
| 2008/0008474 A1 | 1/2008 | Boduch et al. | |
| 2008/0138074 A1 | 6/2008 | Ohtou et al. | |
| 2009/0073424 A1* | 3/2009 | Xia | G02B 6/2852 |
| | | | 356/73.1 |
| 2009/0290870 A1 | 11/2009 | Koyano et al. | |
| 2010/0027953 A1* | 2/2010 | Russell | G02B 6/4452 |
| | | | 385/135 |
| 2010/0211664 A1* | 8/2010 | Raza | H01R 13/6658 |
| | | | 709/223 |
| 2010/0284687 A1* | 11/2010 | Tanzi | H04J 14/0298 |
| | | | 398/1 |
| 2011/0123190 A1 | 5/2011 | Xia et al. | |
| 2011/0267794 A1* | 11/2011 | Anderson | G02B 6/4452 |
| | | | 361/810 |
| 2012/0321255 A1 | 12/2012 | Kewitsch et al. | |
| 2013/0279856 A1 | 10/2013 | Boduch et al. | |
| 2015/0308863 A1* | 10/2015 | Chen | G01D 5/268 |
| | | | 385/12 |
| 2015/0309271 A1* | 10/2015 | Huegerich | G02B 6/4448 |
| | | | 385/101 |
| 2016/0091685 A1* | 3/2016 | Raza | G02B 6/4452 |
| | | | 398/19 |
| 2016/0346058 A1 | 12/2016 | Bacher et al. | |
| 2017/0141846 A1 | 5/2017 | Davidson et al. | |

OTHER PUBLICATIONS

Non-Final Office Action dated Feb. 9, 2017, for U.S. Appl. No. 14/939,511 by Rapipong, J., filed Nov. 12, 2015.

U.S. Appl. No. 14/939,511 by Rapipong, J. et al., filed Nov. 12, 2015.

Supplemental Notice of Allowability dated Jul. 26, 2017 for U.S. Appl. No. 14/939,511 by Rapipong, J., filed Nov. 12, 2015.

Notice of Allowance dated Jun. 29, 2017 for U.S. Appl. No. 14/939,511 by Rapipong, J., et al., filed Nov. 12, 2015.

* cited by examiner

MODULAR MONITORED PATCH PANEL SYSTEM

TECHNICAL FIELD

This patent application is directed to data storage server configurations and, more specifically, to a modular patch panel system.

BACKGROUND

A patch panel is a device that features a number of connectors, usually of the same or similar type, for connecting and routing circuits in a convenient and flexible manner. Patch panels are commonly used in computer networking, and in particular, cases are used with fiber optic cable. As network system infrastructures grow, there can be thousands of patch panel connections in a single system. As patch panels are a manual device, errors in connections can occur that are difficult to troubleshoot and correct. Furthermore, telecommunication bandwidth is often leased based on the number of circuits used. If a circuit has failed or is failing, it is difficult to determine that it has done so, and therefore, the leased bandwidth may be costing a consumer even though the bandwidth is not available. One advantage of traditional patch panels is that they do not rely on electronics or a power source to make and maintain a connection. As long as the connection is physically intact, the patch panel will function. Accordingly, there is a need for patch panel systems that can facilitate troubleshooting and monitoring the interconnected circuits while still remaining a simple fail-safe device.

BRIEF DESCRIPTION OF THE DRAWINGS

Embodiments of the modular monitored patch panel system introduced herein may be better understood by referring to the following Detailed Description in conjunction with the accompanying drawings, in which like reference numerals indicate identical or functionally similar elements.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A modular fiber optic patch panel system is disclosed. In an embodiment, the system includes a patch panel enclosure and at least one patch panel module removably mounted in the enclosure. The patch panel enclosure includes a chassis including a plurality of module bays, each configured to receive a corresponding patch panel module. A plurality of interface connectors are supported on the chassis each of which is associated with a corresponding module bay. The patch panel modules are removably mounted in a corresponding module bay. The patch panel modules include a module housing, an input connector and an output connector. The input connector is mounted to the module housing and configured to receive an optical fiber. The output connector is connected to the input connector and configured to mate with a corresponding one of the plurality of interface connectors. In some embodiments, an optical directional coupler is connected to the input connector and a photodiode is positioned adjacent the optical directional coupler to measure an optical power level conveyed on the optical fiber. A data acquisition device is connected to the photodiode to capture data indicative of the optical power level and a microcontroller is connected to the data acquisition device and configured to store the data captured by the data acquisition device.

A monitored fiber optic patch panel system is disclosed. In an embodiment, the system includes a unit controller and at least one patch panel unit. The unit controller includes a computer, a graphic display, and a Universal Serial Bus (USB) hub. The patch panel unit is connected to the USB hub. The patch panel unit includes a plurality of connectors, each configured to receive a corresponding optical fiber, and a plurality of optical directional couplers, each coupled to a corresponding one of the plurality of connectors. A plurality of photodiodes are each positioned proximate to (e.g., adjacent) a corresponding one of the plurality of optical directional couplers and are configured to measure an optical power level conveyed on the corresponding optical fiber. One or more data acquisition devices are connected to the plurality of photodiodes operative to capture data indicative of the optical power levels. A microcontroller is connected to the one or more data acquisition devices and is configured to store the data captured by the one or more data acquisition devices. The computer is configured (e.g., with hardware and/or software) to receive the stored data from the microcontroller.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1:
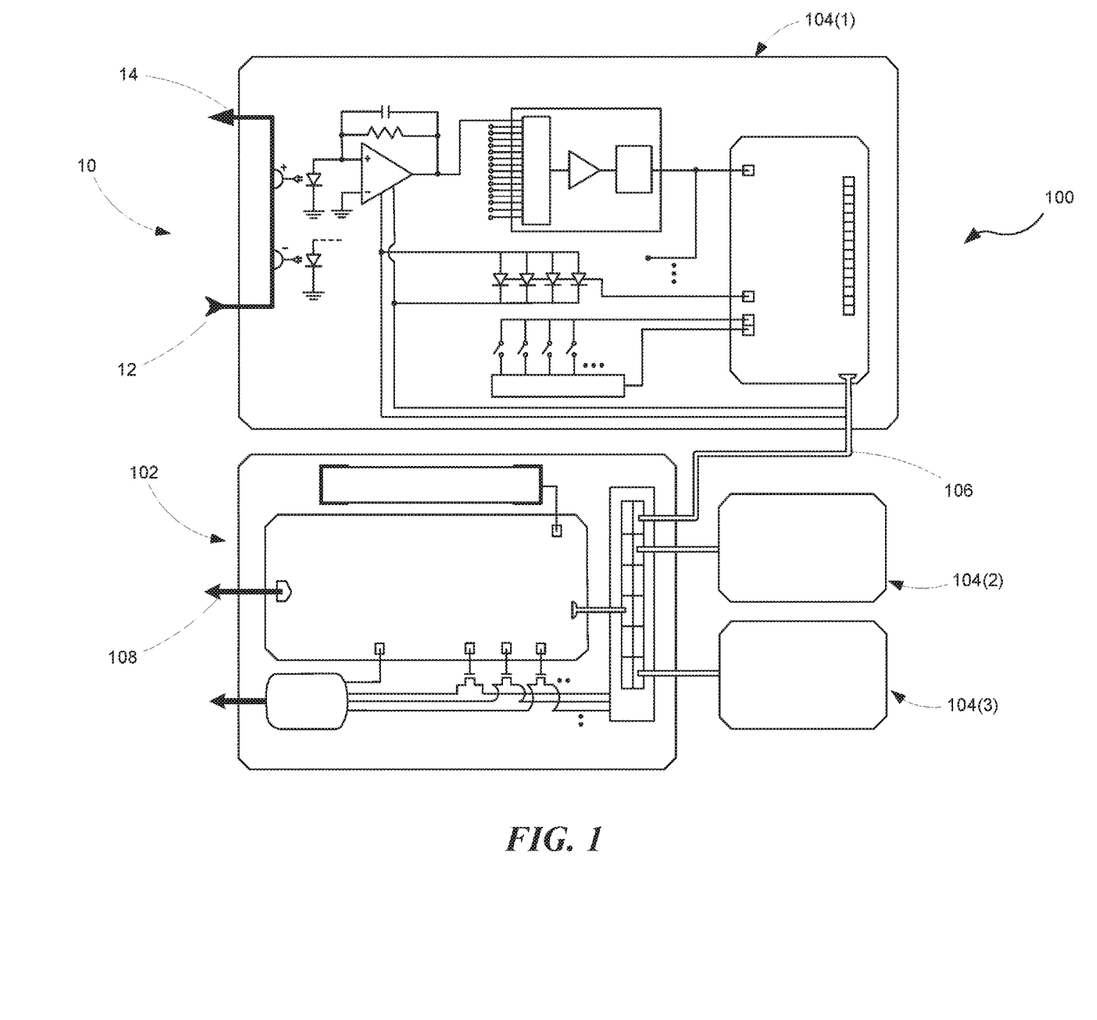
FIG. 1 is a schematic representation of a monitored fiber optic patch panel system according to a representative embodiment.

As shown in FIG. 1, the monitored fiber optic patch panel system 100 includes a unit controller 102 and a plurality of patch panel units 104, such as patch panel units 104(1), 104(2), and 104(3), connected to the unit controller 102 by serial links 106. In some embodiments, the serial links are USB links. In at least one embodiment, the unit controller 102 controls up to 20 patch panel units 104. In at least one embodiment, each patch panel unit can receive up to 48 fiber optic pairs 10. Each fiber optic pair 10 includes an inbound fiber 12 and an outbound fiber 14. Thus, each patch panel unit can receive up to 96 fibers. As explained more fully below, each patch panel unit can monitor and help diagnose each fiber optic connection. The unit controller 102 provides power to the patch panel units 104 via the USB links 106. The unit controller 102 also receives data regarding the fiber optic pairs via the USB links 106 and can transmit that information to a central monitoring location via an Ethernet connection 108.

Figure 2:
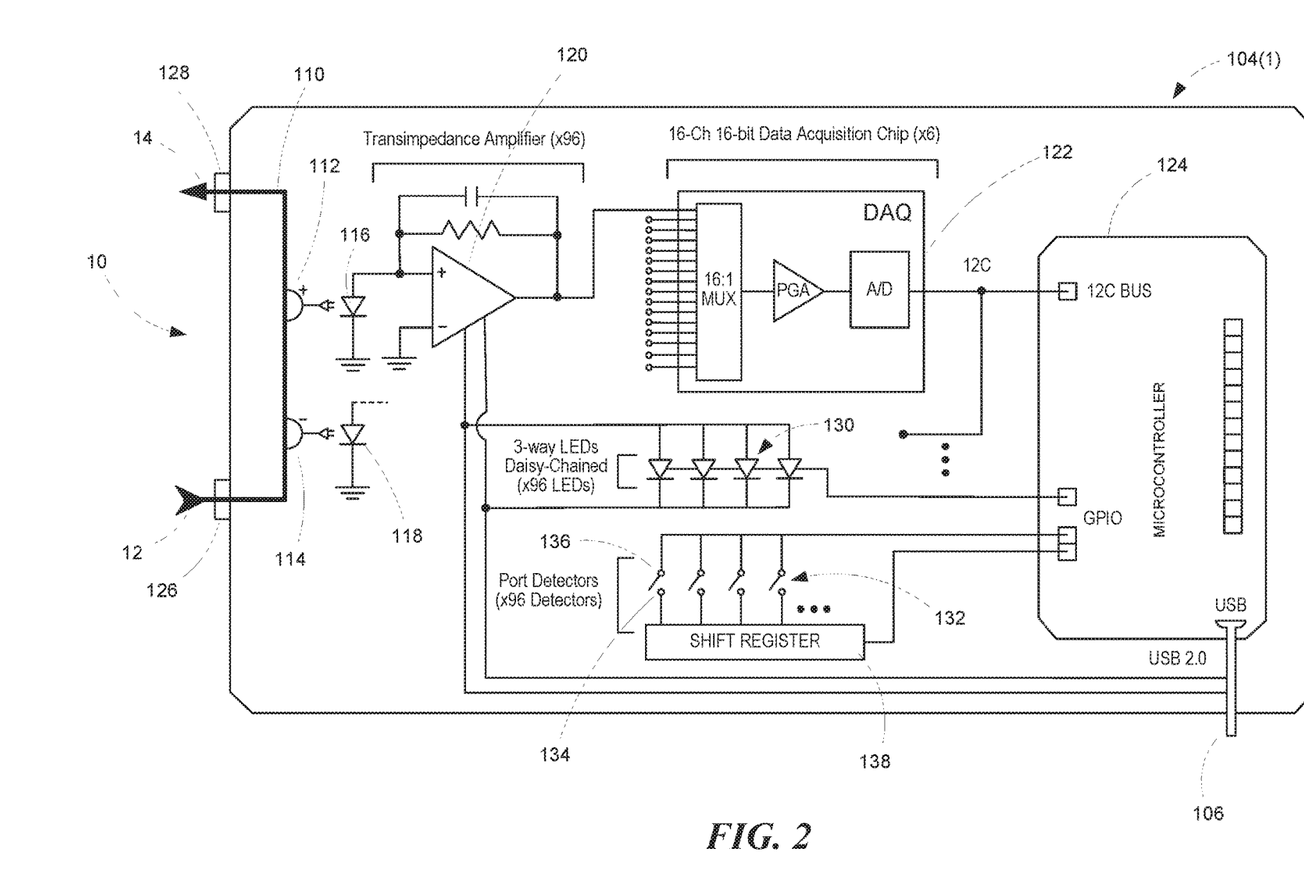
FIG. 2 is a schematic representation of a patch panel unit as shown in FIG. 1.

As shown in FIG. 2, the patch panel unit 104(1) is configured to receive a fiber optic pair 10 for connection and monitoring. Specifically, the patch panel unit 104(1) includes an input connector 126 configured to receive the inbound fiber 12 and an output connector 128 configured to receive the outbound fiber 14. The input connector 126 and the output connector 128 are interconnected with a patch cable 110. The patch cable 110 is connected to a pair of optical directional couplers 112 and 114 configured to measure the power of the fiber optic pair 10.

An optical directional coupler, also referred to herein as an optical tap, taps and monitors signal intensity through an optical fiber. An optical directional coupler taps approximately one to three percent of the optical fiber's signal power. These optical directional couplers are also directional, thereby only measuring the signal intensity in one direction. Thus, the signal intensity in the inbound fiber 12 and the outbound fiber 14 can be measured separately. For example, optical directional coupler 112 may be configured to monitor the signal intensity of outbound traffic from the outbound fiber 14.

Each optical directional coupler has an associated photodiode positioned adjacent to the optical directional coupler in order to measure the optical power level conveyed on the corresponding optical fiber. For example, optical directional coupler 112 has an associated photodiode 116 to measure the signal intensity on outbound fiber 14. Similarly, the signal intensity on inbound fiber 12 is measured with optical directional coupler 114 and photodiode 118. Each photodiode 116 and 118 is connected to a transimpedance amplifier 120 (only one shown for simplicity) to amplify the photodiode signal. A data acquisition device 122 receives the amplified signal from the transimpedance amplifier 120 and converts that from an analog signal to a digital signal that can be recorded by a microcontroller 124. In some embodiments, the microcontroller 124 can be an off-the-shelf open-source microcontroller such as those available from Arduino.

As mentioned above, each patch panel unit 104 can receive 48 pairs of optical fibers. Accordingly, for each pair of connectors (126, 128), there is a patch cable 110, a pair of optical directional couplers (112, 114), a pair of photodiodes (116, 118), and a pair of corresponding transimpedance amplifiers 120. In some embodiments, the data acquisition device 122 can be a 16-channel device. Accordingly, six data acquisition devices 122 are required for each patch panel unit 104. The microcontroller 124 is configured to capture, store and transmit data for each of the 96 ports to the unit controller 102.

Each connector 126, 128 has a corresponding indicator 130 to indicate a status of the connector and/or optical fiber connected to the connector. For example, the indicator 130 can be a three-way (e.g., tri-color) light emitting diode (LED) that indicates whether a cable is connected to the port and/or if there is sufficient signal power on the optical fiber. In some embodiments, the patch panel unit 104 also includes port detectors 132 to detect the presence of a connected optical fiber. The port switches 132 include phototransistors 134 positioned adjacent corresponding connectors, such as connectors 126 and 128, and corresponding LEDs 136 located opposite the phototransistors 134. If an optical fiber is present, the light emitted from LED 136 is blocked from reaching phototransistor 134 which thereby detects that the cable is present. If a cable is not present, then the light from the LED 136 causes phototransistor 134 to register that a cable is missing. Each phototransistor 134 is connected to a shift register 138 that converts the parallel port switch data to a serial data stream for transmission to the microcontroller 124. In some embodiments, the presence of an optical fiber is detected with a mechanical detector, such as a mechanical switch that is engaged when the fiber is connected to a corresponding connector.

Figure 3:
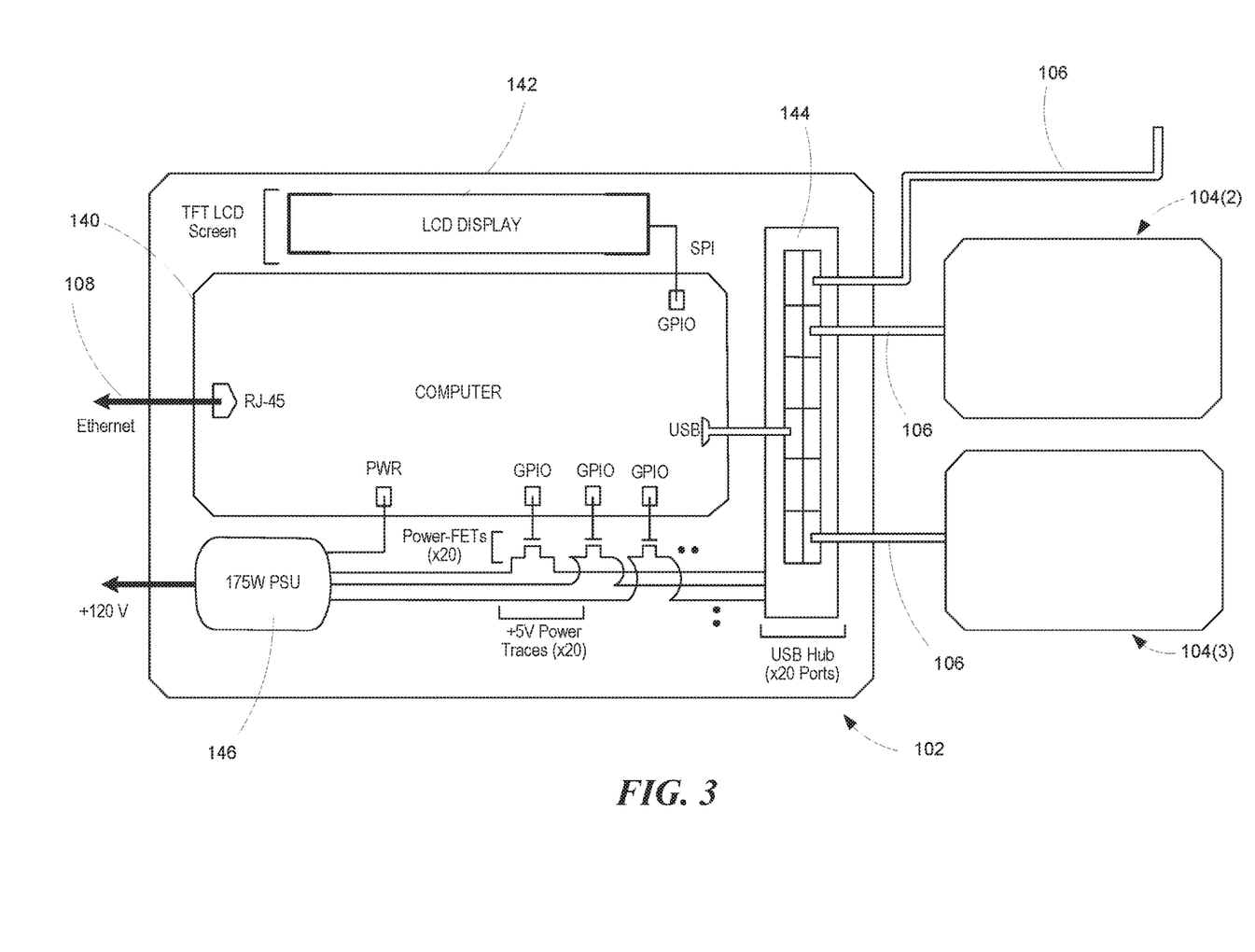
FIG. 3 is a schematic representation of the patch panel unit controller as shown in FIG. 1.

As shown in FIG. 3, the unit controller 102 includes a computer 140 that drives an LCD display 142 to communicate the unit controller status as well as the status of the patch panel units 104. Computer 140 is also connected to a USB hub 144 which, as mentioned above, can include up to 20 ports, each of which can control a separate patch panel unit 104. The computer 140 receives data corresponding to power levels and status indication via the USB links 106 for transmission via Ethernet connection 108. In some embodiments, the unit controller 102 includes a power supply unit 146 that receives power from a 120 volt source, such as a wall outlet or power distribution unit. Power supply unit 146 provides five volt power to the USB hub 144 and also to the computer 140. In at least one representative embodiment, the computer 140 can be an off-the-shelf open-source computer such as those available from the Raspberry Pi Foundation.

In light of the foregoing, it should be appreciated that the monitored fiber optic patch panel system 100 is operative to detect the presence of an optical fiber in a corresponding port with a corresponding port detector 132. Also, each port is equipped with a status indicator LED which, in some embodiments, is a three-way LED that can communicate the status of each port and/or the corresponding optical fiber connected to that port. And finally, the patch panel units can monitor power levels of each fiber optic pair thereby monitoring the connection status of the incoming and outgoing traffic for each pair.

Figure 4:
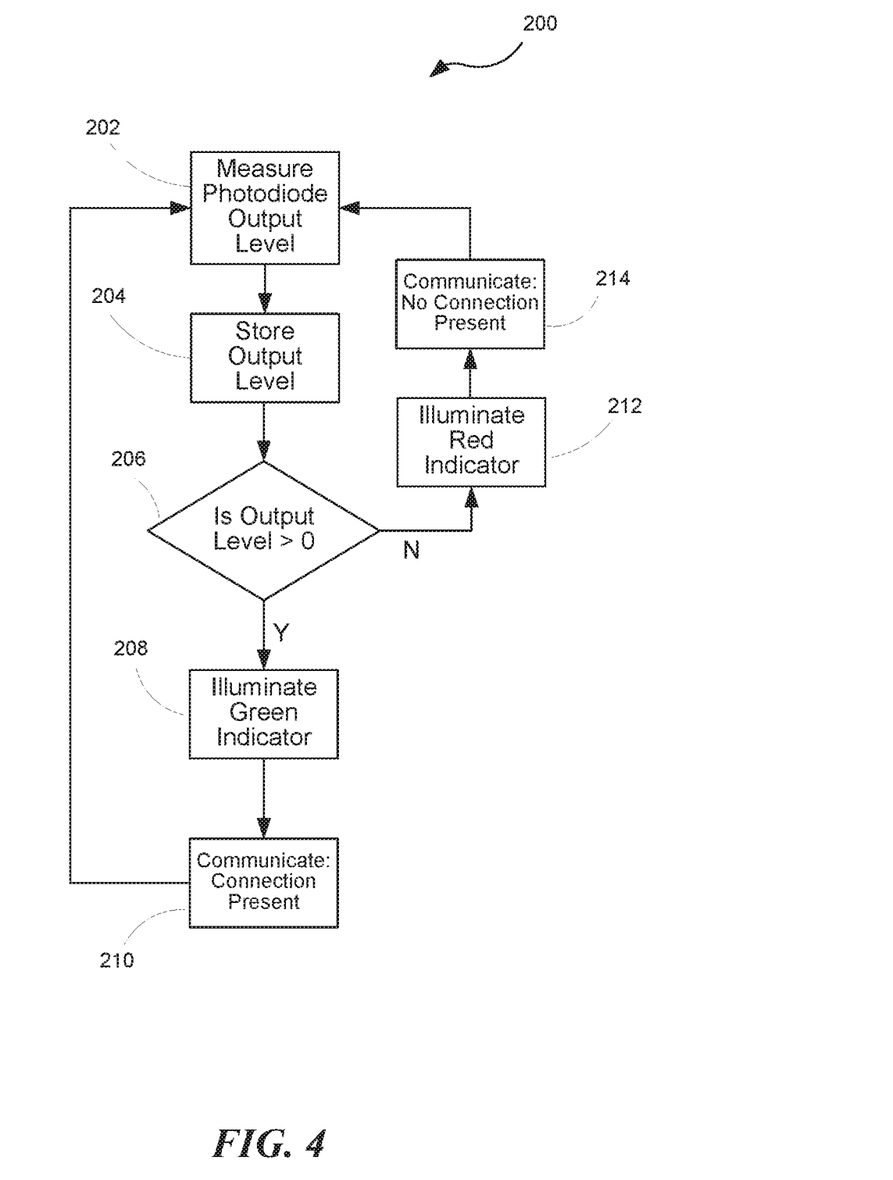
FIG. 4 is flow chart illustrating steps for monitoring a patch panel connector for the presence of an optical fiber according to a representative embodiment.

In some embodiments, the presence of a connected optical fiber can be detected using a corresponding optical directional coupler and its associated photodiode. For example, the flow chart 200, shown in FIG. 4, illustrates steps for monitoring a patch panel connector for the presence of an optical fiber. At step 202, the patch panel can be monitored by measuring, via the photodiode positioned proximate the optical directional coupler, an optical power level conveyed on the optical fiber, wherein the photodiode corresponds to a connector. At step 204, the measured optical power level is stored. In some embodiments, the measured optical power level is stored in a microcontroller. At step 206, whether or not an optical fiber cable is connected to the connector is identified based on the measured optical power level. For example, if the power level is greater than a threshold value (e.g., zero), an optical fiber cable is present, otherwise no cable is present. In some embodiments, a threshold value greater than zero can be selected to account for ambient light. In other embodiments, ranges may be employed to indicate whether the connection is a good connection, a weak connection, or no connection. At step 208, if an optical fiber cable is present, a status indicator can be illuminated to visually communicate the connection status to a user. For example, a tri-color LED can be activated to illuminate green in order to indicate a connection is present and/or that there is a good connection. At step 210, the connection present status can be communicated via the microcontroller and/or controller via USB and/or Ethernet for remote reporting. At step 212, if an optical fiber cable is not present, the tri-color LED can be activated to illuminate red in order to indicate a connection is not present and/or that there is a weak connection. At step 214, the connection not present status can be communicated for remote reporting.

Figure 5:
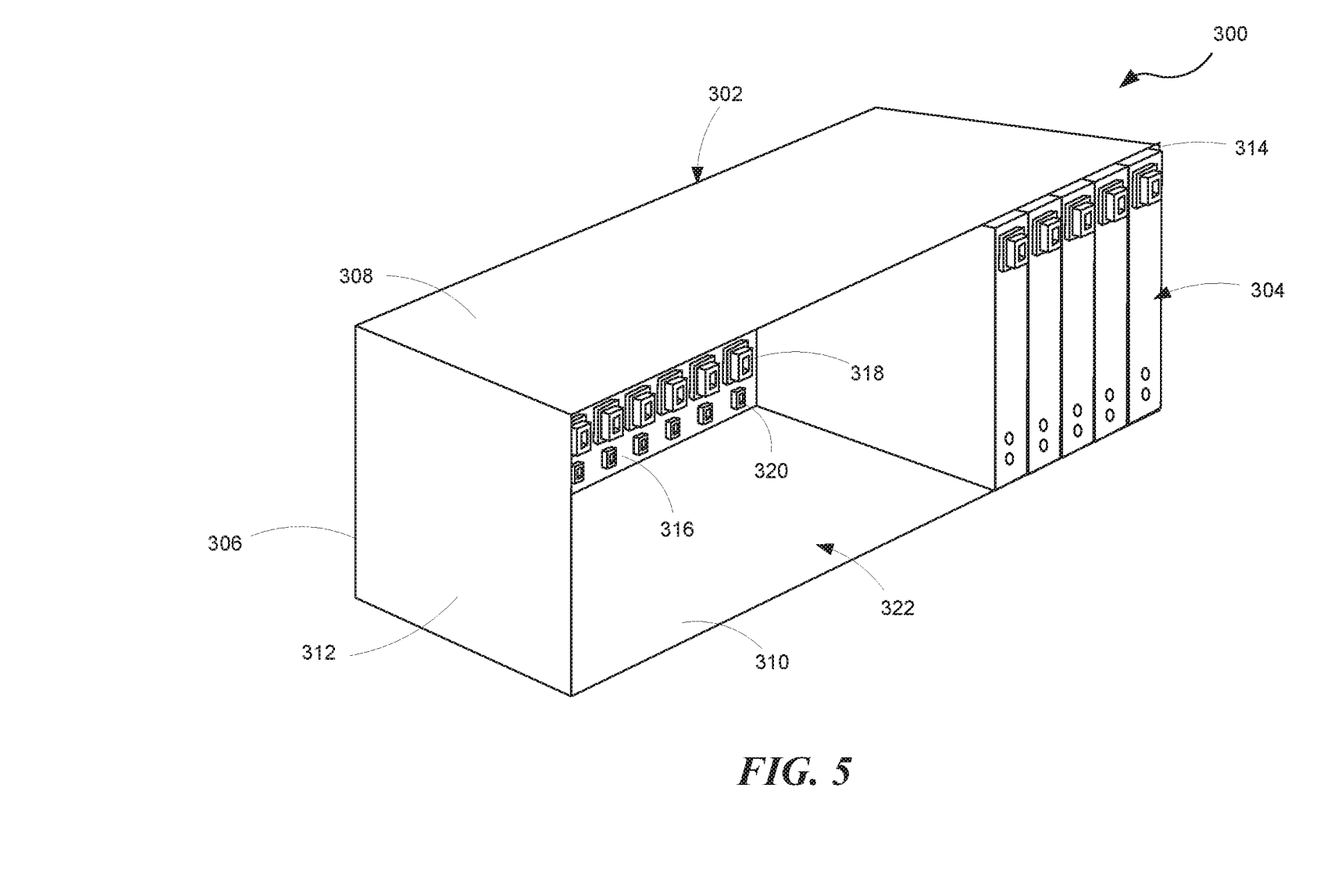
FIG. 5 is an isometric representation of a modular fiber optic patch panel system according to a representative embodiment.

FIG. 5 illustrates a modular fiber optic patch panel system 300 according to a representative embodiment. The modular monitored fiber optic patch panel system 300 includes an enclosure 302 and one or more patch panel modules 304. The patch panel modules 304 can house the necessary components, as explained above with respect to FIGS. 1-4, needed to monitor a single fiber optic pair. Thus, the modular patch panel system 300 allows the enclosure 302 to be populated with only the modules needed for a particular application, thereby providing a cost effective monitored patch panel solution. Furthermore, patch panel modules can be configured with different capabilities depending on the application. For example, in at least one embodiment, a patch panel module can include two optical directional couplers to monitor a single pair of optical fibers. In another representative embodiment, a patch panel module can include four optical directional couplers to monitor a duplex pair of optical fibers. In some embodiments, a patch panel module can include only a pass-through cable with no electronics or optical directional couplers. Therefore, the patch panel enclosure can be populated with only the number and type of patch panel modules needed, thereby reducing the overall cost of the patch panel system. In addition, each module can be replaced or serviced without disrupting the operation of the other modules in the system.

The enclosure 302 includes a chassis 306 including top and bottom walls 308 and 310, sidewalls 312 and 314, and a back wall 316. Back wall 316 supports a plurality of connectors 318 and 320 that interface with the patch panel modules 304. The chassis 306 has an opening 322 opposite the back wall 316 configured to receive patch panel modules 304 into a plurality of bays corresponding to the interface connectors 318 and 320. In some embodiments, the chassis 306 is comprised of sheet metal and can be configured for installation in standard equipment rack configurations.

Figure 6:
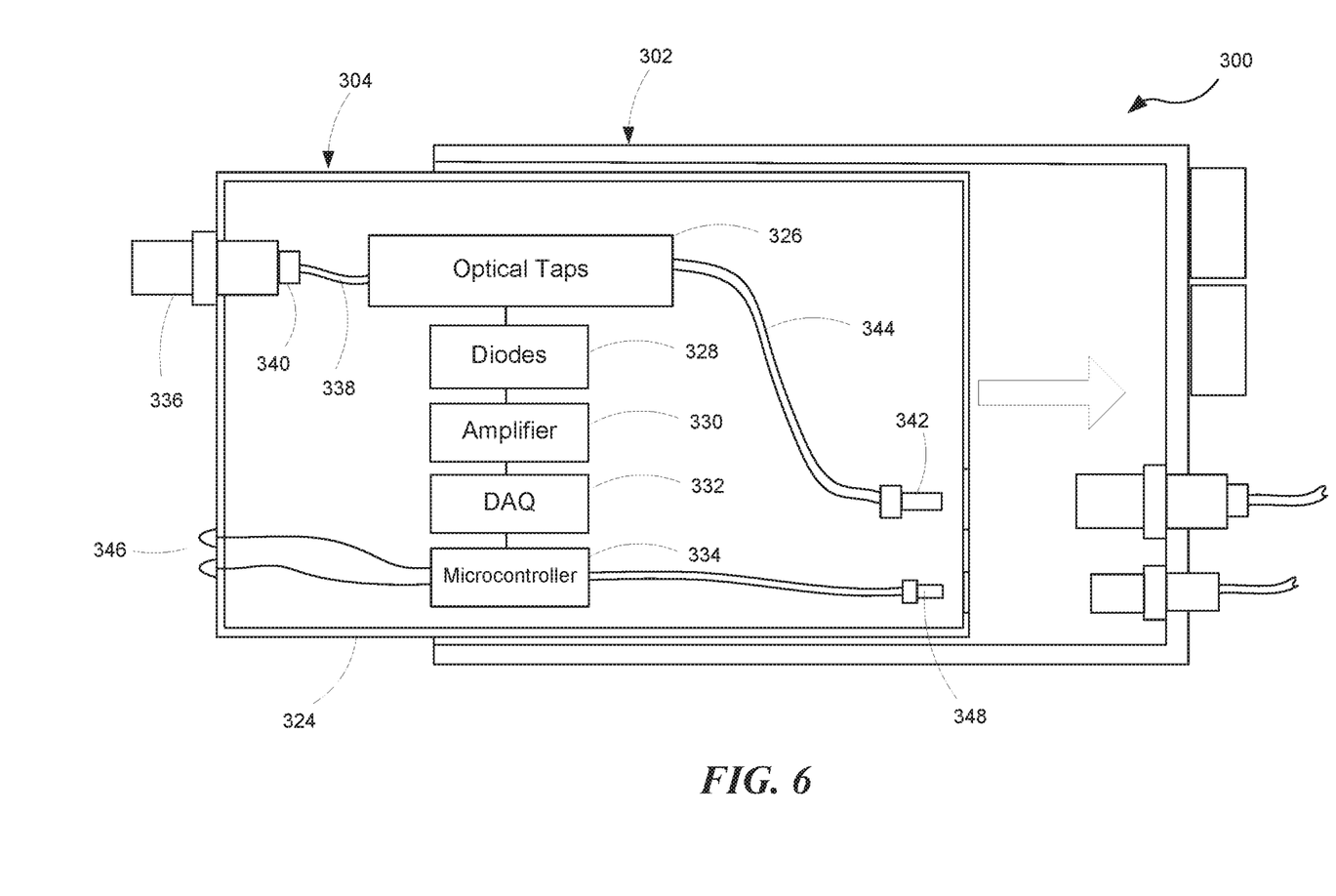
FIG. 6 is a schematic representation of a patch panel module as shown in FIG. 5.

As shown in FIG. 6, an embodiment of the patch panel module 304 includes a module housing 324 containing optical taps or optical directional couplers 326, photodiodes 328, transimpedance amplifiers 330, a data acquisition device 332, and a microcontroller 334. These components can be interconnected and operated generally as described above with respect to FIGS. 1-4. An optical input connector, such as optical coupler 336, is mounted to the module housing 324 and configured to receive an optical fiber. The optical input connector 336 is connected to the optical directional couplers 326 via an optical cable 338 having a connector 340 that is received in the optical coupler 336. An optical output or back feed connector 342 is connected to the optical directional couplers 326 via an optical cable 344 and configured to interface with the patch panel enclosure 302. In some embodiments, the patch panel module 304 includes one or more status indicators 346 connected to the microcontroller 334. In some embodiments, the patch panel module 304 includes a USB connector 348 connected to the microcontroller 334 configured to interface with the enclosure 302.

Figure 7:
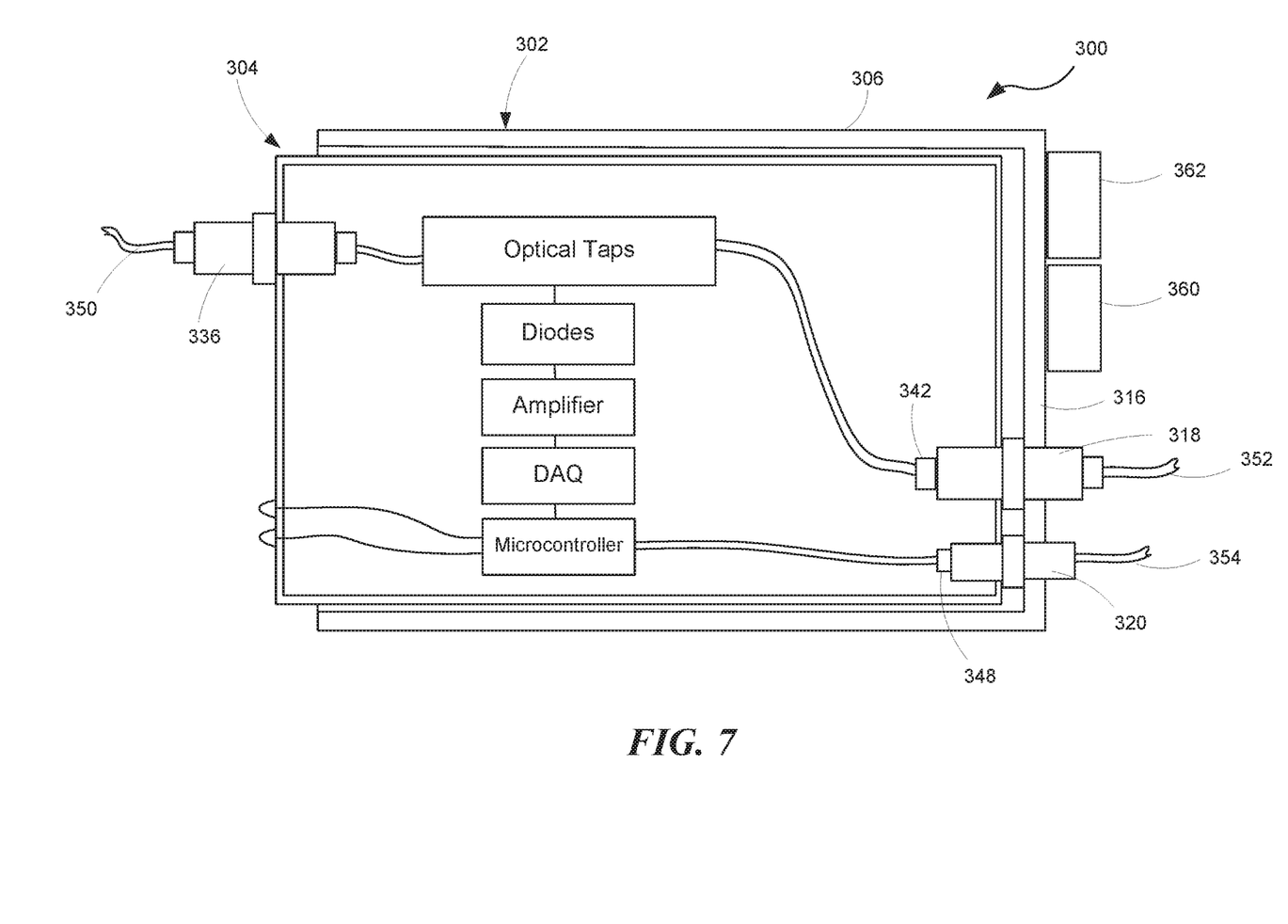
FIG. 7 is a schematic representation of the patch panel module as shown in FIG. 6 connected to the patch panel enclosure shown in FIG. 5.

As shown in FIG. 7, the back feed connector 342 and the USB connector 348 interface with the enclosure 302 via back feed coupler 318 and USB coupler 320, respectively, which are mounted to the back wall 316 of chassis 306 to facilitate blind engagement with the patch panel module 304 as the module is inserted into the enclosure 302. An input cable 350 connects to the input coupler 336 and a back feed cable 352 connects to the back feed coupler 318. In some embodiments, a USB cable 354 connects the USB coupler 320 to a USB hub 360 supported by the enclosure 302. In some embodiments, the enclosure includes a computer 362. Computer 362 is connected to the USB hub 360 and receives data corresponding to power levels and status indication via the USB links 354 for each installed patch panel module 304. The computer 362 and USB hub 360 can be configured in a similar manner as that described above for the unit controller 102 with respect to FIG. 3, for example.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A fiber optic patch panel module for removable insertion into a patch panel enclosure, comprising:
   a module housing;
   an input connector mounted to the module housing and configured to receive an optical fiber;
   a first optical directional coupler connected to the input connector and a second optical directional coupler connected to the first optical directional coupler;
   a first photodiode positioned adjacent the first optical directional coupler and configured to measure a first optical power level corresponding to a first signal direction conveyed on the optical fiber and a second photodiode positioned adjacent the second optical directional coupler and configured to measure a second optical power level corresponding to a second signal direction conveyed on the optical fiber;
   one or more data acquisition devices connected to the first and second photodiodes operative to capture data indicative of the first and second optical power levels;
   a microcontroller connected to the one or more data acquisition devices and configured to store the data captured by the one or more data acquisition devices; and
   an output connector connected to the second optical directional coupler and configured to interface with the patch panel enclosure, wherein the patch panel enclosure includes a back wall and an opening opposite of the back wall, wherein the output connector interfaces with the patch panel enclosure at the back wall, and wherein the input connector is mounted to the module housing at the opening of the patch panel enclosure.

2. The fiber optic patch panel module of claim 1, further comprising a universal serial bus connector connected to the microcontroller and configured to interface with the patch panel enclosure.

3. The fiber optic patch panel module of claim 1, further comprising one or more status indicators connected to the microcontroller.

4. The fiber optic patch panel module of claim 3, wherein the one or more status indicators include a three-way light emitting diode.

5. The fiber optic patch panel module of claim 4, wherein a light emitted from the three-way light emitting diode indicates that a cable is not connected.

6. The fiber optic patch panel module of claim 3, wherein in the event the first optical power level is greater than a threshold value, the one or more one or more status indicators are configured to indicate that a cable is present.

7. A fiber optic patch panel module for removable insertion into a patch panel enclosure, comprising:
   a module housing;
   an input connector mounted to the module housing and configured to receive an optical fiber;
   an output connector connected to the input connector and configured to interface with the patch panel enclosure, wherein the patch panel enclosure includes a back wall and an opening opposite of the back wall, wherein the output connector interfaces with the patch panel enclosure at the back wall, and wherein the input connector is mounted to the module housing at the opening of the patch panel enclosure;
   a first optical directional coupler connected to the input connector;
   a second optical directional coupler connected to the first optical directional coupler and the output connector;
   a first photodiode positioned adjacent the first optical directional coupler and configured to measure an optical power level conveyed on the optical fiber; and
   a data acquisition device connected to the photodiode operative to capture data indicative of the optical power level.

8. The fiber optic patch panel module of claim 7, further comprising a microcontroller connected to the data acquisition device and configured to store the data captured by the data acquisition device and a universal serial bus connector connected to the microcontroller and configured to interface with the patch panel enclosure.

9. The fiber optic patch panel module of claim 7, further comprising one or more status indicators connected to the microcontroller.

10. The fiber optic patch panel module of claim 9, wherein the one or more status indicators include a three-way light emitting diode.

11. The fiber optic patch panel module of claim 10, wherein a light emitted from the three-way light emitting diode indicates that a cable is not connected.

12. The fiber optic patch panel module of claim 9, wherein in the event the first optical power level is greater than a threshold value, the one or more one or more status indicators are configured to indicate that a cable is present.

13. The fiber optic patch panel module of claim 7, further comprising an optical fiber interconnecting the input connector and output connector.

14. The fiber optic patch panel module of claim 7, further comprising a universal serial bus connector configured to interface with the patch panel enclosure.

15. A modular fiber optic patch panel system, comprising:
   a patch panel enclosure, including:
      a chassis including a plurality of module bays, each configured to receive a corresponding patch panel module; and
      a plurality of interface connectors supported on the chassis, each associated with a corresponding module bay;
   at least one patch panel module removably mounted in a corresponding module bay, including:
      a module housing;
      an input connector mounted to the module housing and configured to receive an optical fiber; and
      an output connector connected to the input connector and configured to mate with a corresponding one of the plurality of interface connectors;
      a first optical directional coupler connected to the input connector;
      a second optical directional coupled connected to the first optical directional coupler and the output connector;
      a photodiode positioned adjacent the first optical directional coupler and configured to measure an optical power level conveyed on the optical fiber;
      a data acquisition device connected to the photodiode operative to capture data indicative of the optical power level; and a microcontroller connected to the data acquisition device and configured to store the data captured by the data acquisition device;

wherein the patch panel enclosure includes a back wall and an opening opposite of the back wall, wherein the output connector interfaces with the patch panel enclosure at the back wall, and wherein the input connector is mounted to the module housing at the opening of the patch panel enclosure.

16. The modular fiber optic patch panel system of claim 15, further comprising a universal serial bus hub supported by the chassis and connected to a plurality of universal serial bus interface connectors.

17. The modular fiber optic patch panel system of claim 16, further comprising a universal serial bus connector connected to the microcontroller and configured to mate with a corresponding one of the plurality of universal serial bus interface connectors.

18. The modular fiber optic patch panel system of claim 15, further comprising an optical fiber interconnecting the input connector and output connector.

19. The modular fiber optic patch panel system of claim 15, further comprising one or more status indicators connected to the microcontroller.

20. The modular fiber optic patch panel system of claim 19, wherein in the event the optical power level is greater than a threshold value, the one or more one or more status indicators are configured to indicate that a cable is present.

* * * * *